Figure 1:
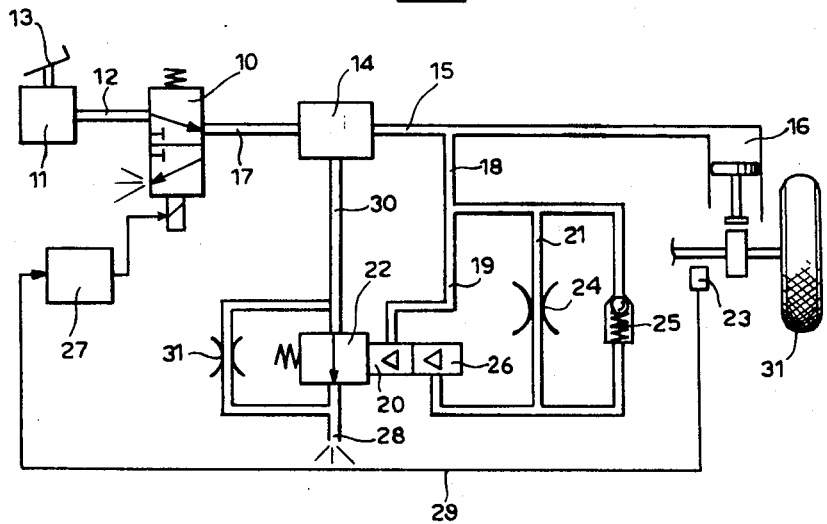

United States Patent [19]
Michellone et al.

[11] 3,713,708
[45] Jan. 30, 1973

[54] METHOD AND APPARATUS FOR THE ANTI-SKID BRAKING OF A VEHICLE WHEEL

[75] Inventors: Giancarlo Michellone, Cambiano; Gilberto Maurizio; Giuseppe Calcia, both of Turin; Dario Brandino, Moncalieri; Mario Palazzetti, Turin, all of Italy

[73] Assignee: Fiat Societa per Azioni, Turin, Italy

[22] Filed: Jan. 19, 1971

[21] Appl. No.: 107,660

[30] Foreign Application Priority Data

Jan. 30, 1970 Italy....................67281 A/70
Jan. 30, 1970 Italy....................67282 A/70

[52] U.S. Cl..................................303/21 F, 188/181 R
[51] Int. Cl. ..........................................B60t 8/04
[58] Field of Search.303/21 F, 61; 188/181 R, 181A, 188/181 C

[56] References Cited

UNITED STATES PATENTS

| | | | |
|---|---|---|---|
| 3,576,351 | 4/1971 | Collins | 303/21 F |
| 3,467,442 | 9/1969 | Davis | 303/21 F |
| 3,494,670 | 2/1970 | Leiber | 303/21 F |
| 3,497,269 | 2/1970 | Van Wicklin | 303/21 F |

*Primary Examiner*—Evon C. Blunk
*Assistant Examiner*—Bruce H. Stoner, J.
*Attorney*—Sughrue, Rothwell, Mion, Zinn & Macpeak

[57] ABSTRACT

In anti-skid braking of a vehicle wheel, in which the braking force is decreased and increased repeatedly during one braking operation in accordance with the dynamic condition of the wheel, the braking force is each time decreased at a substantially instantaneous rate and by a fixed decrement which is not less than the value of pressure that would cause the wheel to lock when the vehicle is braked on slippery ground.

5 Claims, 5 Drawing Figures

INVENTORS
GIANCARLO MICHELLONE, GILBERTO MAURIZIO,
GIUSEPPE CALCIA, DARIO BRANDINO
AND MARIO PALAZZETTI
BY Sughrue, Rothwell, Mion,
       Zinn & Macpeak
                    ATTORNEYS

METHOD AND APPARATUS FOR THE ANTI-SKID BRAKING OF A VEHICLE WHEEL

The invention relates to a method of and apparatus for anti-skid braking.

One of the most serious disadvantages of known anti-skid braking systems is the very discontinuous braking process, characterized by abrupt jolting and jerking of the vehicle during a braking operation. This is due to the fact that the pressure in the brake cylinders is made to change rapidly and over a wide range. Although it has been attempted to confine the jumps of pressure to relatively small values, reducing the pressure by a decrement proportional to its initial value, this is not always possible. Although a fixed percentage of pressure decrement is satisfactory in braking on firm ground, i.e., ground having a relatively high grip coefficient, for example ground that is dry and not slippery, the same percentage decrement does not permit sufficiently wide changes in pressure to prevent skidding on slippery ground, for instance on ice, snow or mud, having a low grip coefficient.

On the other hand, if the apparatus is made to produce a decrement percentage that is sufficient on slippery ground with particularly low grip coefficients, the same percentage decrement can lead to absolute jumps of pressure that are unacceptable for braking on firm ground.

It has in fact been found that there is a maximum permissible absolute jump of pressure during braking, and it is when this is exceeded that jerking and jolting of the vehicle occurs, which is undesirable for various reasons such as the discomfort of the passengers in the vehicle, the dangerous effects on the steering, the reduction of braking efficiency and the like.

An object of the invention is to create a method of braking which is capable of confining the jumps in pressure on the brakes during braking within acceptable limits while still ensuring prevention of skidding of the wheels on any type of ground. This ameliorates the problems outlined above.

The invention achieves the above objects and advantages by means of a method for the anti-skid braking of a vehicle wheel, in which the braking force is decreased and increases repeatedly during one braking operation in accordance with the dynamic condition of the wheel, characterized in that the braking force is each time decreased at a substantially instantaneous rate and by a fixed decrement which is not less than the value of braking force that would cause the wheel to lock when the vehicle is braked on slippery ground.

The invention also contemplates an apparatus for the anti-skid braking of a vehicle wheel, including a source of pneumatic pressure, a brake cylinder, a line connecting the source to the brake cylinder, discharge means connected in the line and an anti-skid device connected to the discharge means and responsive to the dynamic condition of the wheel for repeatedly issuing commands to the discharge means for causing discharge of the pressure as required by the dynamic condition of the wheel during a braking operation, characterized in that the apparatus further includes:

a. differential valve means having two control pressure ports, an inlet port connected to an outlet of the discharge means and an outlet port open to the atmosphere;

b. a line connecting the brake cylinder to one control pressure port of the differential valve means;

c. pressure-retaining means having an inlet connected to the brake cylinder and an outlet port connected to the other control pressure port of the differential valve means; the differential valve means having a normally open passage between the inlet and the outlet ports, which is closed by the pressure in the control ports being lower by not less than a fixed amount than the pressure in the other control port.

For use in the above apparatus, but not exclusively for it, the invention further provides a pneumatic valve, comprising a body having a free passage between an inlet port and an outlet port a plunger movable in a cylindrical cavity which is part of the passage, the plunger having a first position in which the passage is open and a second position in which the passage is closed, characterized in that the plunger is subjected to a first control pressure acting through a first control port, to a second control pressure acting through a second control port and to the action of a spring.

Figure 2:
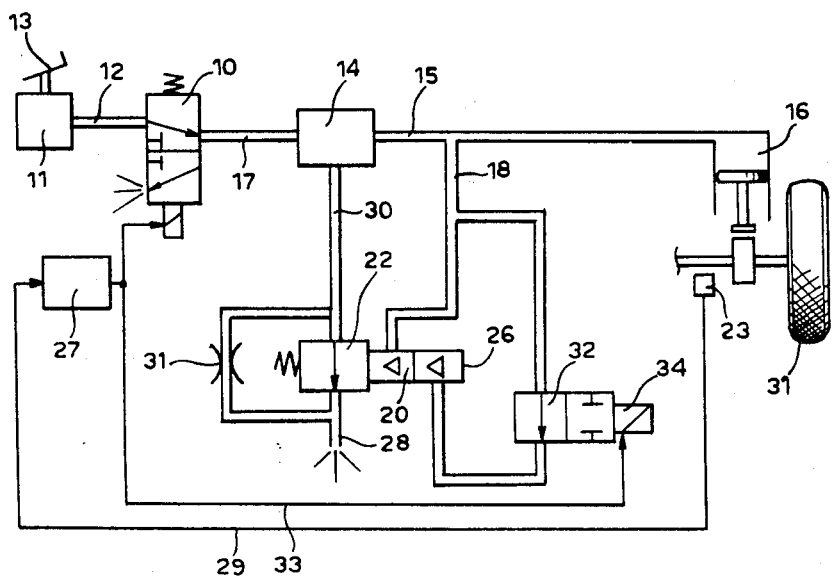
Figure 3:
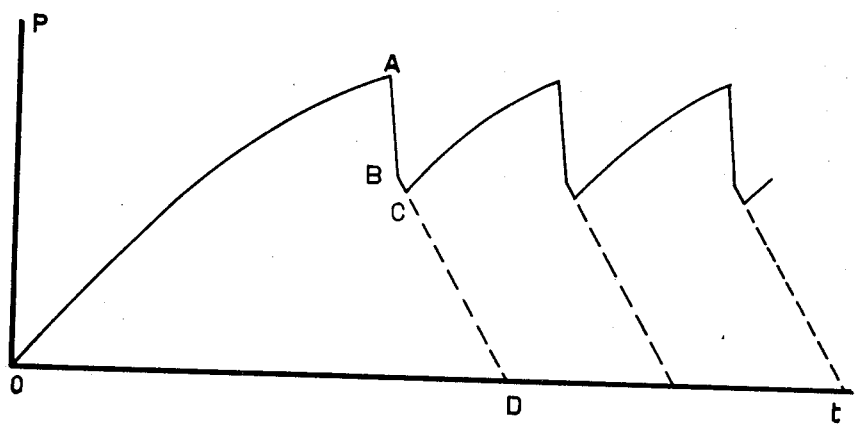
Figure 4:
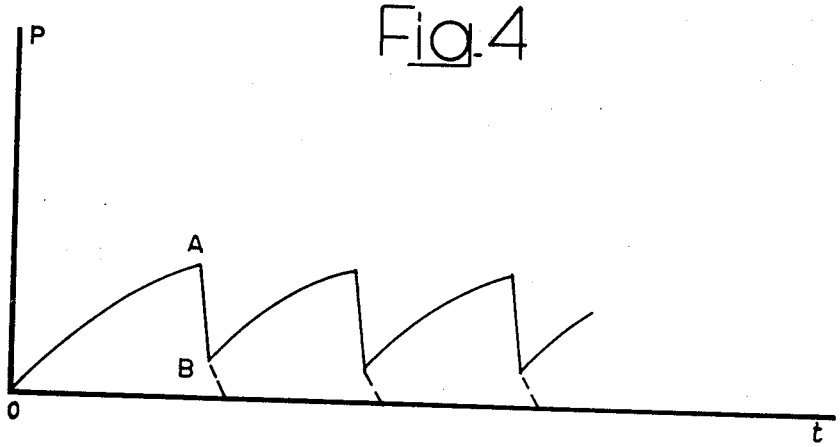

Preferred embodiments of the invention are described below with reference to the accompanying drawings, in which FIG. 1 diagrammatically illustrates a first embodiment of an anti-skid braking system in accordance with the invention, FIG. 2 diagrammatically illustrates a second embodiment of an anti-skid braking system in accordance with the invention, FIG. 3 is a graph showing the pressure P on the brakes as a function of time $t$ during a braking operation on ground with a high grip coefficient, and FIG. 4 is a graph showing the variation of the pressure P on the brakes as a function of time $t$ during a braking operation on slippery ground.

Figure 5:
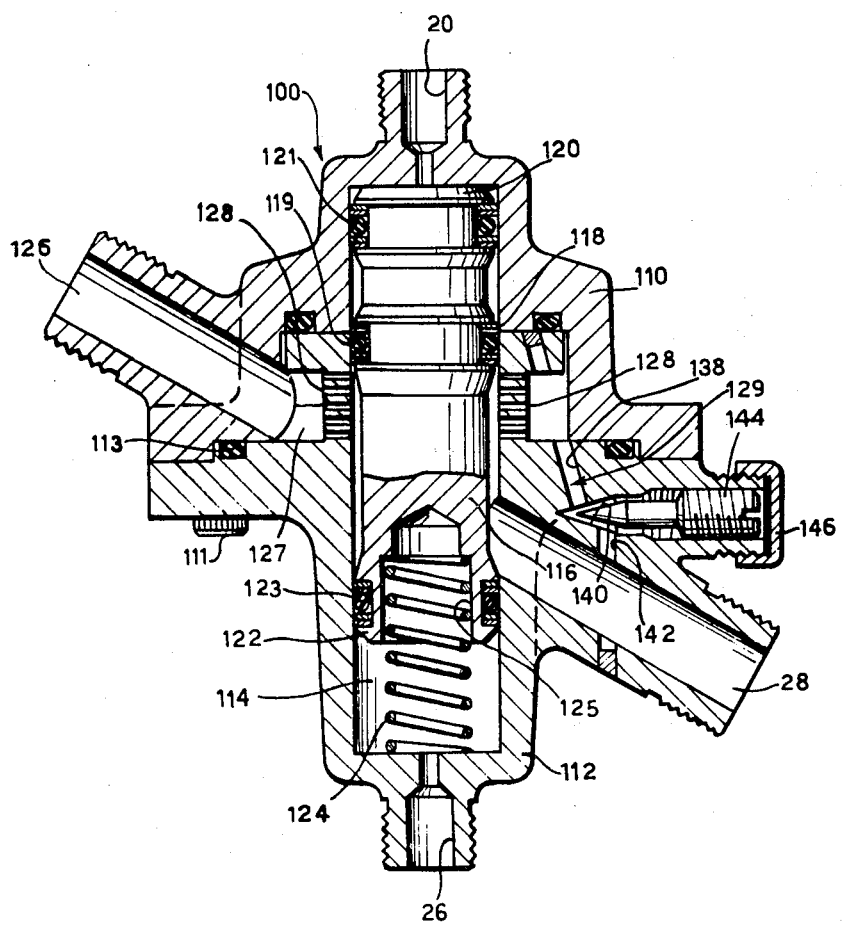

FIG. 5 is a cross-section of a valve suitable for the braking system of FIGS. 1 and 2.

On the basis of the fact that an anti-skid braking system cannot tolerate more than a predetermined maximum jump in pressure during the braking and release cycles.

The constant pressure decrement is preferably of such a value that the pressure on the brakes is discharged to practically zero when braking takes place on slippery ground, whereas the pressure oscillates about a value which is not zero and is relatively high when braking takes on ground with a high grip coefficient.

In this application, the terms "slippery ground" and "ground with a low grip coefficient" denote the kind of surface which is usually considered to require special driving caution by motorists. It includes ice- and snow-covered surfaces, muddy roads, sandy and gravelly ground.

According to the invention, a satisfactory performance both on slippery and on dry ground as above said is achieved by letting the braking pressure fall very rapidly by an amount which is constant and independent of the maximum value reached by the pressure during a braking operation, in such a way that, if such maximum value of the pressure is high, the pressure will undergo fluctuations without ever dropping to zero, while, if the maximum value of the pressure is low, as will be on a slippery ground, the above said amount of reduction will be enough to discharge the pressure completely. In order to achieve this, the amount of reduction is chosen to be substantially equal, or higher, than the maximum admissible braking pressure, that is the maximum braking pressure which will not cause skidding, on an average slippery ground.

In FIG. 1, a solenoid-operated three-way valve 10 with two positions receives a braking pressure through a tube 12 from a source of pneumatic pressure 11, which is controlled by a brake pedal 13. Under normal conditions, the valve 10 transmits the pressure to a quick discharge valve 14 through tube 17. The quick discharge valve 14 is of a known type, and delivers the pressure in the tube 17 to the tube 15, if the pressure in the tube 17 is not less than the pressure in the tube 15. When the pressure in the tube 17 is removed, the quick discharge valve 14 discharges the pressure in the tube 15 to the tube 30, simultaneously shutting off the tube 17.

The tube 15 is connected to a brake cylinder 16, which is adapted to operate a brake of a wheel 31. The pressure transmitted to the brake cylinder 16 also passes through a tube 18 into a branch tube 19 which leads to a first control port 20 of a differential control valve 22 further described below, and through a further branch tube 21 to a throttle 24 in parallel with a check valve 25. This combination of throttle and check valve delivers the pressure to a second control port 26 of the valve 22.

A tachometer 23 provides an anti-skid device 27 with a wheel speed signal through a line 29. When the dynamic condition of the wheel 31 so requires, the anti-skid device 27 supplies a command to the solenoid of the valve 10 to operate the valve to its alternative position, in which the valve exhausts the pressure in the tube to the atmosphere.

A suitable embodiment of an antiskid device is described in the copending application Ser. no. 103092, filed Dec. 31, 1970.

The valve 22 is adapted normally to permit the pressure prevailing in the tube 30 to be discharged to the atmosphere through an exhaust outlet 28, when the pressures in the two control inlets 20 and 26 are equal, and to prevent such discharge when the difference between those two pressures has reached a predetermined threshold value. When the valve 22 is closed, a restricted discharge of the pressure in the tube 30 still occurs through a throttle 31 in parallel with the valve 22.

During a braking operation pressure reaches the tube 12 from the source 11, beginning from the value zero and progressively increasing as shown by the curve O-A in FIG. 3. Through the valve 10, the tube 17, the valve 14, the pressure reaches the tube 15 and the brake cylinder 16. There is no pressure in the tube 30, but the pressure passes into the tube 18 and arrives on the one hand at the port 20 and on the other hand at the port 26 of the valve 22 through the check valve 25 and the throttle 24. The purpose of the check valve 25 is to permit immediate passage of the pressure to the port 26, while the throttle 24 restricts the discharge of the pressure in the opposite direction with a sufficiently long time constant to ensure storing of a substantially constant value of the pressure in the port 26 during a release cycle.

Assume that at a certain pressure value corresponding to the point A in FIG. 3 and FIG. 4 the solenoid operated valve 10 receives from the anti-skid device 27 a command which causes the valve 10 to shut off the tube 12 and discharge the tube 17 to the atmosphere. At this instant the two pressures in the ports 20 and 26 of the valve 22 are equal. The passage from the tube 30 to the exhaust outlet 28 is therefore open. The pressure from the brake cylinder 16, from the tube 15 and therefore from the tube 18 is discharged through the rapid discharge valve 14 into the tube 30 and through the exhaust outlet 28. The pressure in the port 26 is maintained by the check valve 25 and the throttle 24 whereas the pressure in the port 20 is progressively discharged through the tube 18, the tube 15, the valve 14, the tube 30 and the valve 22. When the threshold value of the pressure difference between the port 26 and the port 20 is reached, the valve 22 closes the discharge passage between the tube 30 and the exhaust outlet 28. One of the following two situations may occur. In one of them a command for restoration of the pressure in the brake cylinder reaches the solenoid operated valve 10 from the anti-skid device 27 before the threshold difference between the pressures in the port 26 and in the port 20 is reached; in this case the pressure in the brake cylinder 16 begins to increase again, the rapid discharge valve 14 again closes the passage leading to the tube 30, the pressures applied to the two ports 20 and 26 become equal again and the valve 22 returns to its initial state. In another situation, the command for restoration of the pressure in the brake cylinder 16 arrives after the valve 22 has closed. In this second case, the throttle 31 allows the pressure to decrease, at a slower rate. Even in this case, however, the anti-skid device 27 will eventually restore the communication between tubes 12 and 17 through the valve 10, and so apply the pressure to the brake cylinder 16 again. It is thus certain that the pressure will always be able to fall to values permitting anti-skid braking and release cycles to be produced.

In FIG. 3 the section A-B represents the discharge through the valve 22, whereas the section B-C represents the discharge through the throttle 31. The curve C-D shown by a broken line represents what would be the subsequent law of discharge through the throttle if the anti-skid device 27 did not intervene. In FIG. 4, on the other hand, it is assumed that the command for restoration of the pressure arrives before the throttle 31 in the valve 22 comes into operation. The difference between the pressures at A and at B is the same in both Figures.

FIG. 2 illustrates a second embodiment of the invention, which differs from the first embodiment in that the combination of the check valve 25 and of the throttle 24 is replaced by a solenoid operated valve 32. This valve enables the pressure in the port 26 to be stored with greater accuracy. To this end, the same electrical signal which is received by the solenoid operated valve 10 has to be applied to the solenoid 34 of the valve 32. The valve 32 is normally open and allows the pressure in the tube 18 to reach the port 26. When the electrical command for release reaches the valve 10, the same command closes the valve 32, thus maintaining the pressure in the port 26 irrespectively of the variations which the pressure in the tube 18 undergoes. When the command for restoration of braking arrives, the valve 32 is returned to its normally open state.

The valve 22 together with the throttle 31 can be best embodied by a combination valve and throttle according to the invention, which is shown in FIG. 5.

In FIG. 5, a valve 100 comprises a body consisting of two parts 110 and 112 interconnected by screws 111 and provided with a seal 113. The parts 10 and 12 define a cylindrical cavity 114 in which a plunger 116 can slide. The plunger, shown partly in section, is provided with a collar 118 having a seal 119, and with an upper head 120 and a seal 121, and a lower head 122 which likewise has a seal 123. A recess 125 is formed in the lower end of the plunger to accommodate one end of a reaction spring 124 bearing at its other end against the bottom of the cavity 114. The body part 110 is formed with an inclined inlet passage 126 with a screw-threaded end. Fluid entering the valve can pass through this passage into the cylindrical cavity 114 through an annular cavity 127 and radial holes 128 in the part 110 surrounding this cavity 114. An outlet passage 28 extends obliquely through the part 112 but opens directly into the cylindrical cavity 114.

In the body there is also a composite passage 129 leading from the cavity 127 to the oblique passage 28 and comprising a channel 138, a throttle cavity 140, and a channel 142. The width of the throttle cavity 140 can be adjusted by means of a screw 144 covered by a protective cap 146.

Control pressure can be applied to the two heads 120, 122 of the plunger 116 through two control ports 20 and 26 formed in the top wall and the bottom wall of the valve body. When no control pressure is applied, the spring 124 keeps the plunger 116 in a position in which it bears against the top wall of the cavity 114. In this position the collar 18 of the plunger is fully above the radial holes 128, so that fluid can pass freely from the oblique passage 126 to the oblique passage 28 and also pass through the composite passage 129. But when the pressure in the port 20 is sufficient to overcome the pressure in the inlet 26 combined with the force of the spring 124, the plunger is lowered and the collar 118 moves into a position below the radial holes 128. Communication between the two oblique passages 126 and 28 by way of the cavity 114 is therefore prevented. However, a limited flow of fluid reaches the passage 28 from the passage 126 through the radial holes 128, the chamber 127, and the composite passage 129.

It thus follows that the pressure difference necessary for the actuation of the plunger 116 depends on the strength of the spring 124.

Two preferred embodiments of the invention have been described with reference to pneumatic installations. It is envisaged however that the same method will be capable of being applied, with the necessary modifications, to hydraulic braking systems. Moreover, all of the structural details are given purely by way of example, and persons skilled in the art can make numerous alterations and modifications without changing the general principle of the invention.

What we claim is

1. An apparatus for the anti-skid braking of a vehicle wheel, including a source of pneumatic pressure, a brake cylinder, a line connecting the source to the brake cylinder, discharge means connected in the line and an anti-skid device connected to the discharge means and responsive to the dynamic condition of the wheel for repeatedly issuing commands to the discharge means for causing discharge of the pressure as required by the dynamic condition of the wheel during a braking operation, said apparatus further including:
  a. differential valve means having first and second control pressure ports, an inlet port connected to an outlet of the discharge means and an outlet port open to the atmosphere;
  b. a line connecting the brake cylinder to the first control pressure port of the differential valve means;
  c. pressure-retaining means having an inlet connected to the brake cylinder and an outlet port connected to the second control pressure port of the differential valve means; the differential valve means having a normally open passage between the inlet and the outlet ports, which is closed by the pressure in the first control port being lower by not less than a fixed amount than the pressure in the second control port.

2. The apparatus of claim 1, characterized in that the fixed amount of pressure is not less than the value of braking pressure that would cause the wheel to lock when the vehicle is moving on slippery ground.

3. The apparatus of claim 1, characterized in that the differential valve means has a constantly open restricted passage in parallel between its inlet and outlet ports.

4. The apparatus of claim 1, characterized in that the pressure-retaining means is a parallel combination of a check valve having free passage from the inlet to the outlet and a throttle.

5. The apparatus of claim 1, characterized in that the pressure-retaining means is a normally open valve means which is operated by the commands issued by the anti-skid device for closing during the periods in which the discharge means is open.

* * * * *